US009472169B2

(12) United States Patent
Chen et al.

(10) Patent No.: US 9,472,169 B2
(45) Date of Patent: Oct. 18, 2016

(54) COORDINATE BASED QOS ESCALATION

(71) Applicant: Apple Inc., Cupertino, CA (US)

(72) Inventors: Hao Chen, San Ramon, CA (US); Benjamin K. Dodge, San Jose, CA (US); Peter F. Holland, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 182 days.

(21) Appl. No.: 14/258,662

(22) Filed: Apr. 22, 2014

(65) Prior Publication Data

US 2015/0302544 A1 Oct. 22, 2015

(51) Int. Cl.

| | |
|---|---|
| ***G06T 1/20*** | (2006.01) |
| ***G09G 5/397*** | (2006.01) |
| ***G09G 5/00*** | (2006.01) |
| *G09G 5/14* | (2006.01) |

(52) U.S. Cl.

CPC .............. *G09G 5/397* (2013.01); *G09G 5/001* (2013.01); *G09G 5/14* (2013.01); *G09G 2340/0407* (2013.01); *G09G 2340/10* (2013.01); *G09G 2350/00* (2013.01); *G09G 2352/00* (2013.01); *G09G 2360/125* (2013.01)

(58) Field of Classification Search

None

See application file for complete search history.

(56) References Cited

U.S. PATENT DOCUMENTS 5,999,199 A * 12/1999 Larson .................. G06T 15/005 345/531
6,119,207 A * 9/2000 Chee ......................... G06F 5/12 710/40
6,804,757 B2 10/2004 Weber
6,850,243 B1 * 2/2005 Kilgariff ................ G06T 15/04 345/421
6,919,904 B1 * 7/2005 Kilgariff ................ G06T 15/04 345/426
7,114,086 B2 9/2006 Mizuyabu et al.
7,243,041 B2 7/2007 Nalawadi et al.
7,657,706 B2 2/2010 Iyer et al.
7,692,642 B2 4/2010 Wyatt
7,975,192 B2 7/2011 Sommer et al.
8,125,490 B1 2/2012 Vaidya et al.

(Continued)

FOREIGN PATENT DOCUMENTS

CN 101419579 4/2009

OTHER PUBLICATIONS

Lee, Chanho. "Smart Bus Arbiter for QoS control in H. 264 decoders." Journal of Semiconductor Technology and Science 11.1 (2011): 33-39.*

(Continued)

*Primary Examiner* — Xiao Wu
*Assistant Examiner* — Yu Chen
(74) *Attorney, Agent, or Firm* — Rory D. Rankin; Meyertons, Hood, Kivlin, Kowert & Goetzel, P.C.

(57) ABSTRACT

Systems and methods for determining priorities of pixel fetch requests of separate requestors in a display control unit. The distance between the oldest pixel in an output buffer and the output equivalent coordinate of the oldest outstanding source pixel read request for each requestor in the display control unit is calculated. Then, a priority is assigned to each requestor based on this calculated distance. If a given requestor lags behind the other requestors based on a comparison of the distance between the oldest pixel and the output equivalent coordinate of the oldest outstanding source pixel read, then source pixel fetch requests for this given requestor are given a higher priority than source pixel fetch requests for the other requestors.

20 Claims, 10 Drawing Sheets

(56) References Cited

U.S. PATENT DOCUMENTS

| | | | |
|---|---|---|---|
| 8,314,807 B2 | 11/2012 | Biswas et al. | |
| 8,963,938 B2 | 2/2015 | Holland | |
| 9,019,291 B2 | 4/2015 | Holland et al. | |
| 2007/0101330 A1* | 5/2007 | Aizawa | G06F 9/4812 718/100 |
| 2008/0252648 A1* | 10/2008 | Rai | G06T 1/60 345/531 |
| 2009/0096797 A1 | 4/2009 | Du et al. | |
| 2011/0169849 A1 | 7/2011 | Bratt et al. | |
| 2012/0072679 A1 | 3/2012 | Biswas et al. | |
| 2012/0131306 A1 | 5/2012 | Bratt et al. | |
| 2012/0206474 A1 | 8/2012 | Holland et al. | |

OTHER PUBLICATIONS

Roberts, David Andrew, "Efficient Data Center Architectures Using Non-Volatile Memory and Reliability Techniques", University of Michigan, 2011, pp. 1-170.

* cited by examiner

Table 500

| Requestor ID | Output Coordinate of Oldest Outstanding Request | Oldest Equivalent Coordinate | Pixel Distance Ahead | QoS Level |
|---|---|---|---|---|
| 505A | (N+2,M+30) | (N,M) | 4126 pixels | Green |
| 505B | (N+1,M+29) | (N,M) | 2077 pixels | Green |
| 505C | (N+1,M-840) | (N,M) | 1208 pixels | Yellow |
| 505D | (N,M+8) | (N,M) | 8 pixels | Red |

FIG. 5

COORDINATE BASED QOS ESCALATION

BACKGROUND

1. Field of the Invention

The present invention relates generally to video processing, and in particular to methods and mechanisms for generating priorities for pixel fetch requests within a digital system.

2. Description of the Related Art

Displays are incorporated into a wide variety of systems and devices such as smart phones, tablets, netbooks, notebook computers, and other devices. These systems and devices include functionality for generating images and data, including video information, which are subsequently output to a display device. Such devices typically include video graphics circuitry to process digital images and video information for subsequent display.

In digital imaging, the smallest item of information in an image is called a "picture element," or more generally referred to as a "pixel." For convenience, pixels are typically arranged in a regular two-dimensional grid. By using such an arrangement, many common operations can be implemented by uniformly applying the same operation to each pixel independently. Since each pixel is an elemental part of a digital image, a greater number of pixels can provide a more accurate representation of the digital image. To represent a specific color on an electronic display, each pixel may have three values, one each for the amounts of red, green, and blue present in the desired color. Some formats for electronic displays may also include a fourth value, called alpha, which represents the transparency of the pixel. This format is commonly referred to as ARGB or RGBA. Another format for representing pixel color is YCbCr, where Y corresponds to the luma, or brightness, of a pixel and Cb and Cr correspond to two color-difference chrominance components, representing the blue-difference (Cb) and red-difference (Cr).

Most images and video information displayed on display devices such as LCD screens are interpreted as a succession of image frames, or frames for short. While generally a frame is one of the many still images that make up a complete moving picture or video stream, a frame can also be interpreted more broadly as simply a still image displayed on a digital (discrete, or progressive scan) display. A frame typically consists of a specified number of pixels according to the resolution of the image/video frame. Most graphics systems use frame buffers to store the pixels for image and video frame information. The term "frame buffer" therefore often denotes the actual memory used to hold picture/video frames. The information in a frame buffer typically consists of color values for every pixel to be displayed on the screen. Color values are commonly stored in 1-bit monochrome, 4-bit palletized, 8-bit palletized, 16-bit high color and 24-bit true color formats. The total amount of the memory required for frame buffers to store image/video information depends on the resolution of the output signal, and on the color depth and palette size.

The frame buffers can be situated in memory elements dedicated to store image and video information, or they can be situated in the system memory. Consequently, system memory may be used to store a set of pixel data that defines an image and/or video stream for display on a display device. Typically, applications running in such a system can write the pixel data into the system memory, from where the pixel data may be obtained to eventually generate a set of image/video signals for generating the image on the display device. In such systems, fetching the frames (pixel information) from system memory may place high demands on the system, as other devices may also be competing for memory access. As consequence, a high bandwidth may be required from memory in order to keep up with the requests for data. In addition, as each system memory access requires a certain amount of processing power, requests for high volume pixel data may eventually result in premature battery depletion in battery-operated devices, such as mobile phones, tablets, and notebook computers.

The design of a smartphone or tablet may include user interface layers, cameras, and video sources such as media players. Each of these sources may utilize video data stored in memory. A corresponding display controller may include multiple internal pixel-processing pipelines for these sources. Each of these pixel-processing pipelines may make requests to memory for the corresponding source frames.

In addition to the pixel-processing pipelines, a typical device also has numerous other non-display related functional units that need access to memory (e.g. processors, peripherals, etc.). For example, a processor accesses memory to read instructions for execution, to read and write data during execution of the instructions, etc. A network device reads and writes packet data to/from memory. A mass storage device writes stored data being transferred to memory, or reads memory data being transferred to the mass storage device Each memory request sent from one of the multiple sources includes both overhead processing and information retrieval processing. A large number of requests from separate sources of the device may create a bottleneck in the memory subsystem. The repeated overhead processing may reduce the subsystem performance.

With numerous devices potentially accessing memory, a mechanism for selecting among requests, ordering requests from different requestors, etc. is needed. The mechanism needs to balance performance requirements of the requestors (which differ, depending on the type of requester) as well as providing good memory performance (e.g. grouping operations to the same page of memory to improve memory bandwidth utilization and reduce average power consumption, etc.).

Some devices are categorized as real-time devices. These devices are characterized by a need to receive data at a certain rate in real time, or erroneous operation may occur. For example, video data needs to be provided within the frame rate of the video, or visual artifacts may occur on the display. Similarly, audio devices are real time. If the audio data is not available at the audio rate, skips in the audio playback may occur. Other devices are non-real time, such as processors. Non-real time devices can perform better if data is provided more rapidly, but will not have erroneous operation if data is not provided as rapidly.

One mechanism that can be used to balance the requirements of real time and non-real time device is quality of service (QoS). The real time devices can be provided with several levels of QoS, with increasing levels of priority. As the need for data becomes more critical to prevent erroneous operation, the device can issue memory operations with higher levels of QoS. The memory controller can respond more rapidly to this higher QoS requests, preventing the erroneous operation that might otherwise occur.

There are costs for issuing the higher QoS requests, at the system level. The memory controller may bypass other requests that might be more efficiently performed together (e.g., requests that are to an already-open page in the memory). Accordingly, overall system performance can suffer if the QoS levels of real time requests are increased too frequently. Because erroneous operation occurs for real time devices if their data needs are not met, the determination of which QoS level to use for a given memory operation may be made conservatively (i.e., assuming a worst case scenario in terms of memory load from other requestors in the system). However, while such determinations can ensure the correct operation of the real time devices, the increase in QoS levels can occur more frequently than necessary if the worst case scenario is not in effect, reducing memory bandwidth utilization and increasing power consumption in the memory unnecessarily.

SUMMARY

Systems and methods for performing coordinate based QoS escalation are disclosed.

In various embodiments, a semiconductor chip includes a memory controller and a display controller. The memory controller may control accesses to a shared memory, such as an external memory located off of the semiconductor chip. The display controller may include a display pipeline configured to read frame data stored in memory for an image to be presented on a display. The display pipeline may include one or more pixel-processing pipelines configured to process pixel data and convey the processed pixel data to a single output first-in first-out (FIFO) buffer. Each of the pixel-processing pipelines may be able to process the frame data received from the memory controller for a respective video source. Each of the pixel-processing pipelines may independently and simultaneously access respective frame buffers stored in memory. In some embodiments, the display controller may be configured to composite the destination frames from source frames of the video sequence and one or more other image sources. A destination frame may then be presented on a respective display screen.

In one embodiment, each source frame may be associated with a separate requestor identifier (ID). In some cases during the processing of multiple source frames, the fetching of source pixels for a single requestor may lag behind the other requestors. Rather than escalating the priority of outstanding fetch requests for all requestors in these cases, only the priority of the delayed requestor may be escalated while the other requestors may maintain their current priority level. In one embodiment, the priority level for the requestors may be designated using a quality of service (QoS) level which is assigned to each fetch request.

In one embodiment, the display control unit may calculate an output equivalent coordinate for each source pixel fetch request generated by the various requestors. The output equivalent coordinate of a given source pixel is the coordinate of the earliest output pixel that cannot be generated without the given source pixel. A given source pixel may only be a part of one (or multiple) output pixels when scaling or blending is performed. In some cases, even when not scaling, a source pixel may be modified before being displayed. When scaling, it is possible for multiple source pixels to have the same output equivalent coordinate. However, in some cases, if scaling is not performed, there may be a 1:1 correspondence between the coordinates of the source pixels of the source frame and the coordinates of the destination pixels of the destination frame.

In one embodiment, the output coordinate of the oldest pixel in the pixel processing pipeline(s) for each requestor may be determined. In one embodiment, the oldest pixel may be the next pixel to be popped from the output FIFO. Also, the output equivalent coordinate of the oldest outstanding read request for each requestor may be determined. The output equivalent coordinate of the oldest outstanding read request refers to the youngest output pixel for which all corresponding source pixels have not yet been received by the display pipeline. The difference between the oldest pixel and the output equivalent coordinate of the oldest outstanding read request may be calculated for each requestor. In other words, the display control unit may determine for each requestor how many output pixels ahead the requestor is of the next pixel to be popped out of the output FIFO. The display processing unit may then use these per-requestor output pixel distances when generating a priority level for source pixel fetch requests on a per-requestor basis.

In one embodiment, one or more programmable thresholds may be utilized. The per-requestor output pixel distance may be compared to the threshold(s) and the priority level of corresponding requests may be set based on the comparison to the threshold(s). For example, in one embodiment, if the output pixel distance is less than a low threshold, then the outstanding requests for the corresponding requestor ID may be given the highest priority. In some embodiments, the display control unit may implement on and off thresholds to permit hysteresis in the changing between priority levels. The hysteresis may help avoid rapidly and/or repeatedly transitioning back and forth between priority levels over a short period of time. Accordingly, for each priority level there may be an on threshold above which the output pixel distance is to rise to increase the priority level, and an off threshold below which the output pixel distance is to drop to decrease the priority level. In such embodiments, the current priority level may be included in determining the priority level for a request, in addition to the thresholds. Other embodiments may not implement hysteresis and may have one threshold level per priority level. It is noted that embodiments which support hysteresis may be programmed to operate without hysteresis by setting the on and off thresholds to the same value.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 5 illustrates one embodiment of a table of per-requestor pixel distances.

DETAILED DESCRIPTION OF EMBODIMENTS

Figure 1:
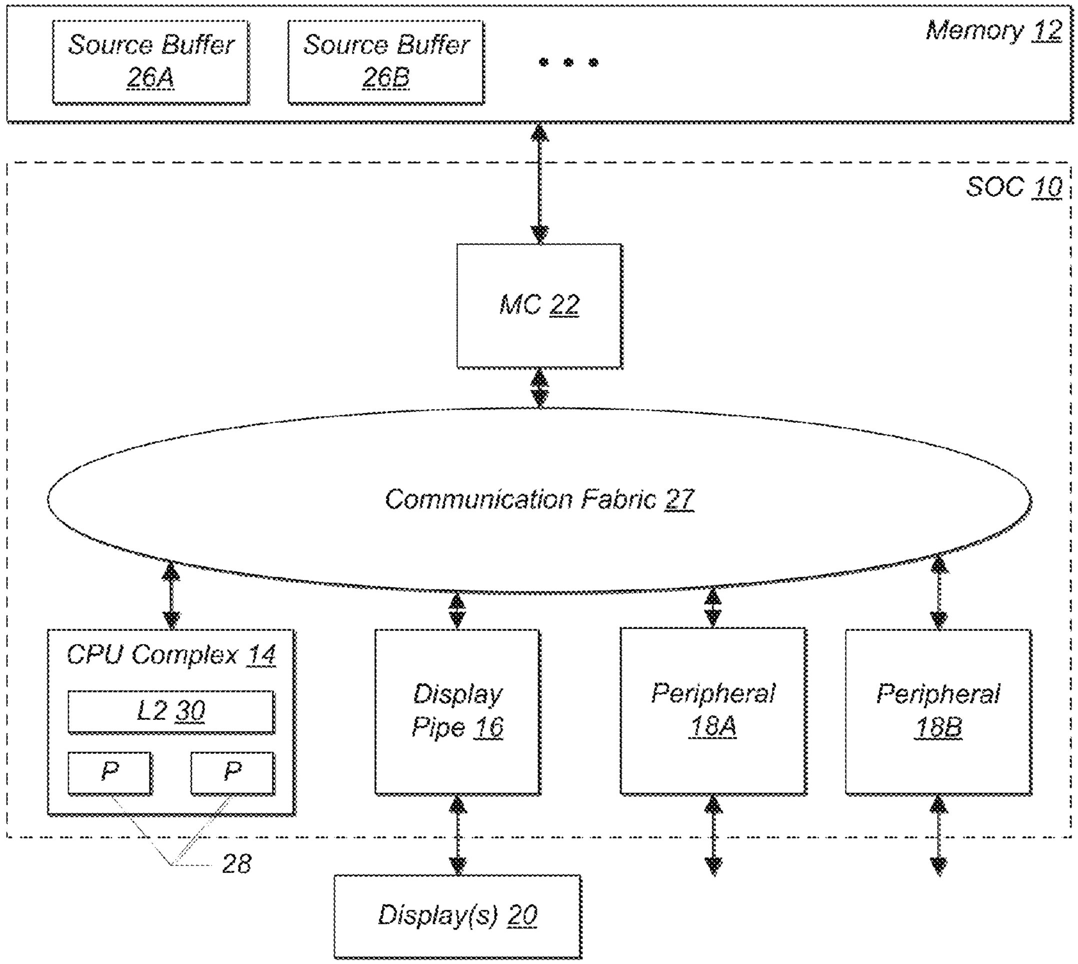
FIG. 1 is a block diagram illustrating one embodiment of a system on chip (SOC) coupled to a memory and one or more display devices.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising a pixel processing pipeline . . . ." Such a claim does not foreclose the apparatus from including additional components (e.g., a processor, a memory controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a display controller with a plurality of requestors, the terms "first" and "second" requestors can be used to refer to any two of the plurality of requestors.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Turning now to FIG. 1, a block diagram of one embodiment of a system on chip (SOC) 10 is shown coupled to a memory 12 and one or more display devices 20. A display device may be more briefly referred to herein as a display. As implied by the name, the components of the SOC 10 may be integrated onto a single semiconductor substrate as an integrated circuit "chip." In some embodiments, the components may be implemented on two or more discrete chips in a system. However, the SOC 10 will be used as an example herein. In the illustrated embodiment, the components of the SOC 10 include a central processing unit (CPU) complex 14, a display pipe 16, peripheral components 18A-18B (more briefly, "peripherals"), a memory controller 22, and a communication fabric 27. The components 14, 16, 18A-18B, and 22 may all be coupled to the communication fabric 27. The memory controller 22 may be coupled to the memory 12 during use. Similarly, the display pipe 16 may be coupled to the displays 20 during use. In the illustrated embodiment, the CPU complex 14 includes one or more processors 28 and a level two (L2) cache 30.

The display pipe 16 may include hardware to process one or more still images and/or one or more video sequences for display on the displays 20. Generally, for each source still image or video sequence, the display pipe 16 may be configured to generate read memory operations to read the data representing the frame/video sequence from the memory 12 through the memory controller 22. In one embodiment, each read operation may include a quality of service (QoS) parameter that specifies the requested QoS level for the operation. The QoS level may be managed to ensure that the display pipe 16 is provided with data in time to continue displaying images without visual artifacts (e.g., incorrect pixels being displayed, "skipping", or other visually-identifiable incorrect operation).

The display pipe 16 may be configured to perform any type of processing on the image data (still images, video sequences, etc.). In one embodiment, the display pipe 16 may be configured to scale still images and to dither, scale, and/or perform color space conversion on the frames of a video sequence. The display pipe 16 may be configured to blend the still image frames and the video sequence frames to produce output frames for display. The display pipe 16 may also be more generally referred to as a display control unit. A display control unit may generally be any hardware configured to prepare a frame for display from one or more sources, such as still images and/or video sequences.

More particularly, the display pipe 16 may be configured to retrieve source frames from one or more source buffers 26A-26B stored in the memory 12, composite frames from the source buffers, and display the resulting frames on the display 20. Source buffers 26A and 26B are representative of any number of source buffers which may be stored in memory 12. Accordingly, display pipe 16 may be configured to read the multiple source buffers 26A-26B and composite the image data to generate the output frame. In some embodiments, rather than displaying the output frame, the resulting frame may be written back to memory 12. In one embodiment, there may be four separate requestors in display pipe 16, and each requestor may retrieve data from a separate plane of a video or user interface frame. In other embodiments, display pipe 16 may include other numbers of requestors.

The displays 20 may be any sort of visual display devices. The displays may include, for example, touch screen style displays for mobile devices such as smart phones, tablets, etc. Various displays 20 may include liquid crystal display (LCD), light emitting diode (LED), plasma, cathode ray tube (CRT), etc. The displays may be integrated into a system including the SOC 10 (e.g. a smart phone or tablet) and/or may be a separately housed device such as a computer monitor, television, or other device. The displays may also include displays coupled to the SOC 10 over a network (wired or wireless).

In some embodiments, the displays 20 may be directly connected to the SOC 10 and may be controlled by the display pipe 16. That is, the display pipe 16 may include hardware (a "backend") that may provide various control/data signals to the display, including timing signals such as one or more clocks and/or the vertical blanking interval and horizontal blanking interval controls. The clocks may include the pixel clock indicating that a pixel is being transmitted. The data signals may include color signals such as red, green, and blue, for example. The display pipe 16 may control the displays 20 in real-time, providing the data indicating the pixels to be displayed as the display is displaying the image indicated by the frame. The interface to such displays 20 may be, for example, VGA, HDMI, digital video interface (DVI), a liquid crystal display (LCD) interface, a plasma interface, a cathode ray tube (CRT) interface, any proprietary display interface, etc.

The CPU complex 14 may include one or more CPU processors 28 that serve as the CPU of the SOC 10. The CPU of the system includes the processor(s) that execute the main control software of the system, such as an operating system. Generally, software executed by the CPU during use may control the other components of the system to realize the desired functionality of the system. The CPU processors 28 may also execute other software, such as application programs. The application programs may provide user functionality, and may rely on the operating system for lower level device control. Accordingly, the CPU processors 28 may also be referred to as application processors. The CPU complex may further include other hardware such as the L2 cache 30 and/or an interface to the other components of the system (e.g., an interface to the communication fabric 27).

The peripherals 18A-18B may be any set of additional hardware functionality included in the SOC 10. For example, the peripherals 18A-18B may include video peripherals such as video encoder/decoders, image signal processors for image sensor data such as camera, scalers, rotators, blenders, graphics processing units, etc. The peripherals 18A-18B may include audio peripherals such as microphones, speakers, interfaces to microphones and speakers, audio processors, digital signal processors, mixers, etc. The peripherals 18A-18B may include interface controllers for various interfaces external to the SOC 10 including interfaces such as Universal Serial Bus (USB), peripheral component interconnect (PCI) including PCI Express (PCIe), serial and parallel ports, etc. The peripherals 18A-18B may include networking peripherals such as media access controllers (MACs). Any set of hardware may be included.

The memory controller 22 may generally include the circuitry for receiving memory operations from the other components of the SOC 10 and for accessing the memory 12 to complete the memory operations. The memory controller 22 may be configured to access any type of memory 12. For example, the memory 12 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 22 may include various queues for buffering memory operations, data for the operations, etc., and the circuitry to sequence the operations and access the memory 12 according to the interface defined for the memory 12.

The communication fabric 27 may be any communication interconnect and protocol for communicating among the components of the SOC 10. The communication fabric 27 may be bus-based, including shared bus configurations, cross bar configurations, and hierarchical buses with bridges. The communication fabric 27 may also be packet-based, and may be hierarchical with bridges, cross bar, point-to-point, or other interconnects.

It is noted that the number of components of the SOC 10 (and the number of subcomponents for those shown in FIG. 1, such as within the CPU complex 14) may vary from embodiment to embodiment. There may be more or fewer of each component/subcomponent than the number shown in FIG. 1. It is also noted that SOC 10 may include many other components not shown in FIG. 1. In various embodiments, SOC 10 may also be referred to as an integrated circuit (IC), an application specific integrated circuit (ASIC), or an apparatus.

Figure 2:
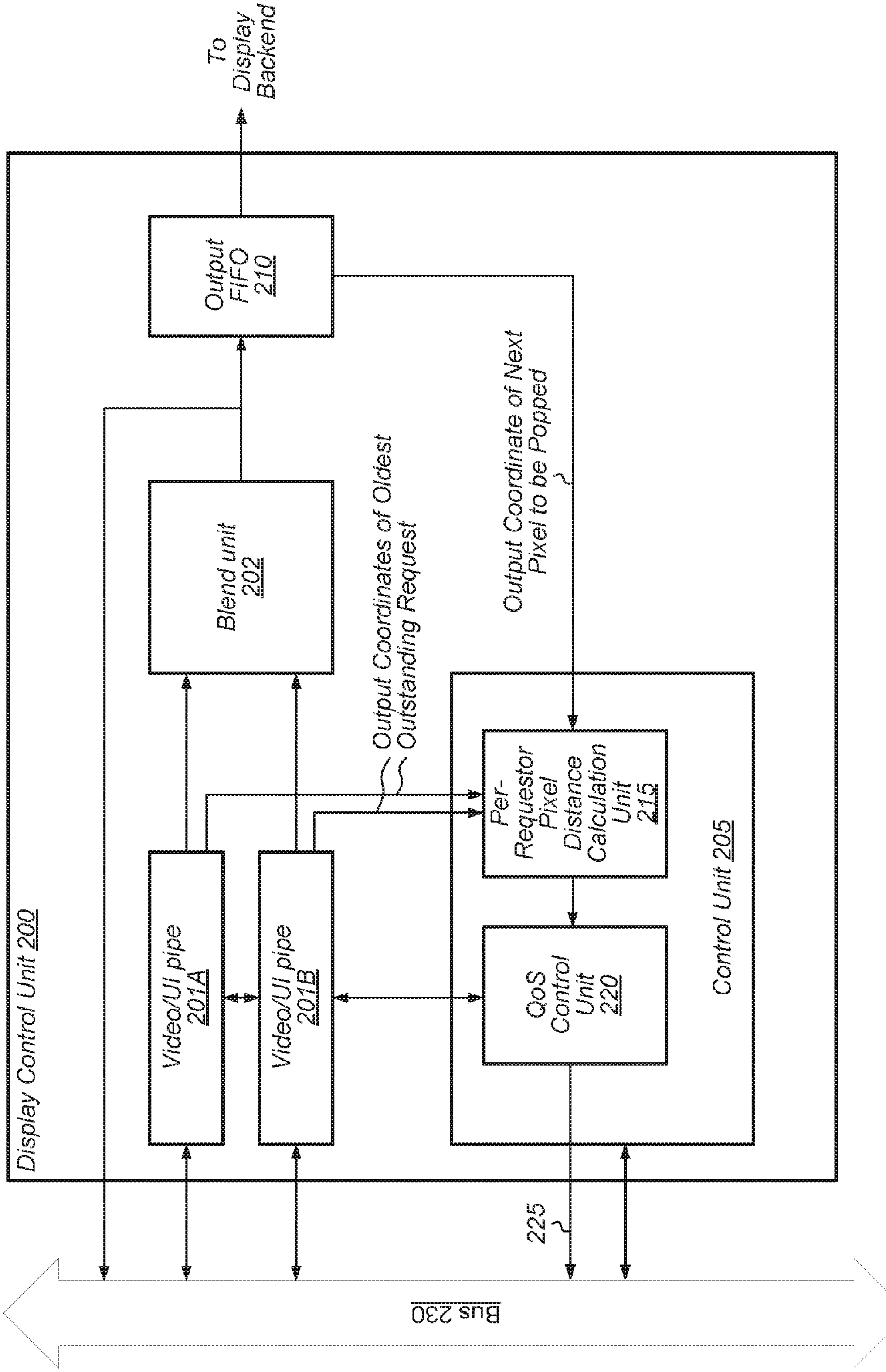
FIG. 2 is a block diagram illustrating one embodiment of a display control unit.

FIG. 2 illustrates one embodiment of a display control unit 200. Display control unit 200 may represent display pipe 16 included in SOC 10 in FIG. 1. Display control unit 200 may be coupled to a system bus 230 and to a display backend (not shown). In some embodiments, a display backend may directly interface to the display to display pixels generated by display control unit 200. Display control unit 200 may include functional sub-blocks such as one or more video/user interface (UI) pipelines 201A-B, blend unit 202, control unit 205, and output First-In, First-Out buffer (FIFO) 210. Display control unit 200 may also include other components (e.g., control registers, parameter FIFO) which are not shown in FIG. 2 to avoid cluttering the figure.

System bus 230, in some embodiments, may correspond to communication fabric 27 from FIG. 1. System bus 230 couples various functional blocks such that the functional blocks may pass data between one another. Display control unit 200 may be coupled to system bus 230 in order to receive video frame data for processing. In some embodiments, display control unit 200 may also send processed video frames to other functional blocks and/or memory that may also be coupled to system bus 230.

The display control unit 200 may include one or more video/UI pipelines 201A-B, each of which may be a video and/or user interface (UI) pipeline depending on the embodiment. It is noted that the terms "video/UI pipeline" and "pixel processing pipeline" may be used interchangeably herein. In other embodiments, display control unit 200 may have one or more dedicated video pipelines and/or one or more dedicated UI pipelines. Each video/UI pipeline 201 may fetch a video or image frame from a buffer coupled to system bus 230. The buffered video or image frame may reside in a system memory such as, for example, system memory 12 from FIG. 1. Each video/UI pipeline 201 may fetch a distinct image and may process the image in various ways, including, but not limited to, format conversion (e.g., YCbCr to ARGB), image scaling, and dithering. In some embodiments, each video/UI pipeline may process one pixel at a time, in a specific order from the video frame, outputting a stream of pixel data, and maintaining the same order as pixel data passes through.

In one embodiment, when utilized as a user interface pipeline, a given video/UI pipeline 201 may support programmable active regions in the source image. The active regions may define the only portions of the source image to be displayed. In an embodiment, the given video/UI pipeline 201 may be configured to only fetch data within the active regions. Outside of the active regions, dummy data with an alpha value of zero may be passed as the pixel data.

In one embodiment, display control unit 200 may utilize a separate requestor ID for each plane of the source pixel data. For example, a two-plane YUV source may be retrieved from memory and processed by two separate requestors, with a requestor for each plane. In one embodiment, display control unit 200 may be processing two separate two-plane sources for a total of four requestor IDs. Each requestor may be monitored separately to determine if it is falling behind the other requestors. In one embodiment, control unit 205 may be configured to track how far ahead each requestor is of the most recently popped pixel from output FIFO 210 as a way of determining if the display is at risk of exhibiting visual artifacts.

Blend unit 202 may receive a pixel stream from one or more video/UI pipelines 201. If only one pixel stream is received, blend unit 202 may simply pass the stream through to the next sub-block. However, if more than one pixel stream is received, blend unit 202 may blend the pixel colors together to create an image to be displayed. In various embodiments, blend unit 202 may be used to transition from one image to another or to display a notification window on top of an active application window. For example, a top layer video frame for a notification, such as, for a calendar reminder, may need to appear on top of an internet browser window. The calendar reminder may comprise some transparent or semi-transparent elements in which the browser window may be at least partially visible, which may require blend unit 202 to adjust the appearance of the browser window based on the color and transparency of the calendar reminder.

In some embodiments, the blended pixel stream may be converted to a different color space after gamut corrections have been applied. For example, the color space may be changed based on the intended target display. The output of blend unit 202 may be a single pixel stream composite of the one or more input pixel streams. The pixel stream output of blend unit 202 may be sent to output FIFO 210 or back onto system bus 230. In other embodiments, the pixel stream may be sent to other target destinations. For example, the pixel stream may be sent to a network interface.

Output FIFO 210 may be configured to store pixels output from blend unit 202. A FIFO as used and described herein, may refer to a memory storage buffer in which data stored in the buffer is read in the same order it was written. A FIFO may be comprised of RAM or registers and may utilize pointers to the first and last entries in the FIFO.

Output FIFO 210 may be the interface to the display backend (not shown), which may control the display to display the pixels generated by display control unit 200. The display backend may read pixels at a regular rate from output FIFO 210 according to a pixel clock. The rate may depend on the resolution of the display as well as the refresh rate of the display. For example, a display having a resolution of N×M and a refresh rate of R frames per second may have a pixel clock frequency based on N×M×R. On the other hand, output FIFO 210 may be written by blend unit 202 as pixels are generated by blend unit 202. In some instances, the rate at which display control unit 200 generates pixels may be faster than the rate at which the pixels are read, assuming that data is provided to display control unit 200 from the memory (not shown) quickly enough. The pixels in output FIFO 210 may thus be a measure of a margin of safety for display control unit 200 before erroneous operation is observed on the display. Additionally, the amount of data that is available within video/UI pipes 201A-B to generate additional pixels for the output FIFO 210 may be viewed as an additional margin of safety.

Control unit 205 may receive various control signals and include various control logic for managing the overall operation of display control unit 200. For example, control unit 205 may receive a signal to indicate a new video frame is ready for processing. In some embodiments, this signal be generated outside of display control unit 200 and in other embodiments display control unit 200 may generate the signal. The parameters that display control unit 200 uses to control how the various sub-blocks manipulate the video frame may be stored in various control registers (not shown). These registers may include data setting input and output frame sizes, setting input and output pixel formats, location of the source frames, and destination of the output.

Control unit 205 may also be configured to monitor how far ahead each requestor is of the next pixel to be popped from the output FIFO 210. Control unit 205 may receive indications from the video/UI pipes 201A-B and output FIFO 210 regarding the output equivalent coordinates of the youngest and oldest pixels of each requestor in the display control unit 200. Control unit 205 may determine a pixel distance from the difference between the output coordinate of the next pixel to be popped and the output equivalent coordinate of the youngest source pixel on a per-requestor basis. The youngest source pixel refers to the youngest (or furthest ahead) source pixel with all older source pixels having already been received by the corresponding video/UI pipe 201. For example, if the source frame is being scanned from top to bottom and from left to right, the pixels to the top and left are considered older than pixels to the bottom and right of the source frame. Accordingly for this scanning pattern, when determining the relative age of two pixels on the same row of the source frame, the pixel further to the right would be considered the younger of the two pixels.

In one embodiment, there may be four requestors in display controller 200, with two requestors per video/UI pipe 201A-B. Other embodiments may have other numbers of requestors. Control unit 205 may utilize the per-requestor pixel distance to designate a quality of service (QoS) state for each requestor. The QoS states may be utilized to control the priority of requests that are sent to memory from each requestor. In one embodiment, there may be three QoS levels—green, yellow, and red corresponding to low, medium, and high levels of priority, respectively. The QoS information may be generated per request and/or may be communicated to the communication fabric and memory subsystem via sideband signaling.

In some embodiments, the fetch requests generated by video/UI pipes 201A-B may be processed out of order and some younger pixels may be received from the source buffer prior to older pixels. Accordingly, there may be gaps of missing pixels which have yet to be received between the youngest received pixel and the youngest consecutively received pixel. The pixel distance ahead as calculated by control unit 205 refers to the number of consecutive pixels (without any intervening gaps) that are available for processing and display without relying on any additional source pixels being retrieved from the memory subsystem.

This per-requestor pixel distance allows control unit 205 to determine if any requestors are lagging behind the other requestors and to utilize QoS control unit 220 to increase the QoS level of these lagging requestors. By increasing the QoS level of only these lagging requestors, memory subsystem performance is not as burdened as it would be if the QoS level were increased for all requestors. When the QoS level of the lagging requestors is increased, the priority of their outstanding fetch requests and new fetch requests will be increased, allowing these requestors to catch up to the other requestors which are further ahead. In one embodiment, control unit 205 may calculate a per-requestor pixel distance and then convey these distances to QoS control unit 220. QoS control unit 220 may compare each distance to one or more thresholds and utilize the result of the comparisons to generate a QoS level for each requestor.

The QoS control unit 220 may receive the per-requestor pixel distances, and may be configured to compare the per-requestor pixel distances to one or more programmable thresholds. In one embodiment, QoS control unit 220 may implement green, yellow, and red QoS levels as increasing levels of priority. There may be a threshold for each level (except for the green level, since that is the normal level if all of the thresholds have been exceeded). Thus, an embodiment that implements the green, yellow, and red QoS levels may include a red threshold and a yellow threshold. The red threshold may be the lowest threshold. If the pixel distance for a given requestor is less than the red threshold, the QoS control unit 220 may generate the red QoS level for the given requestor. If the pixel distance is greater than the red threshold but less than the yellow threshold, the QoS control unit 220 may generate the yellow QoS level. If the pixel distance is greater than the yellow threshold, the QoS control unit 220 may generate the green QoS level. The QoS control unit 220 may provide the generated level to the corresponding video/UI pipe 201, which may transmit the QoS level with each memory read operation for the given requestor to bus 230. The QoS level may also be transmitted to the memory subsystem via sideband channel 225 to increase the QoS level of outstanding requests for the given requestor.

In one embodiment, the QoS control unit 220 may implement on and off thresholds to permit hysteresis in the changing between levels. That is, for each QoS level there may be an on threshold above which the pixel distance is to rise to increase the QoS level, and an off threshold below which the pixel distance is to drop to decrease the QoS level. In such embodiments, the current QoS level may be included in determining the QoS level for a request, in addition to the thresholds. Other embodiments may not implement hysteresis and may have one threshold level per QoS level. It is noted that embodiments which support hysteresis may be programmed to operate without hysteresis by setting the on and off thresholds to the same value.

It is noted that the display control unit 200 illustrated in FIG. 2 is merely an example. In other embodiments, different functional blocks and different configurations of functional blocks may be possible depending on the specific application for which the display processor is intended. For example, more than two video/UI pipelines may be included within a display control unit in other embodiments.

Figure 3:
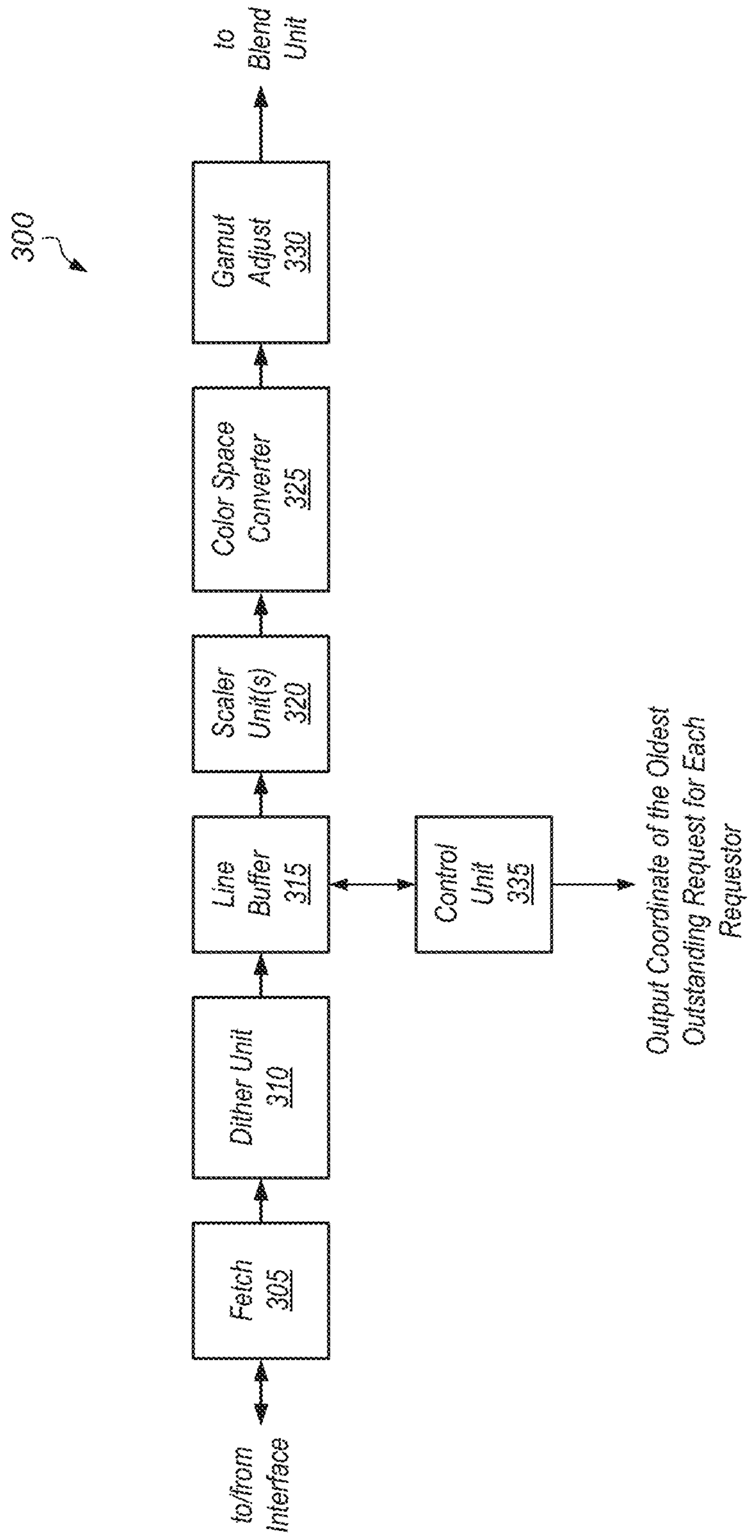
FIG. 3 is a block diagram illustrating one embodiment of a video/UI pipeline.

Turning to FIG. 3, a block diagram of one embodiment of a video/UI pipeline 300 is shown. Video/UI pipeline 300 may correspond to video/UI pipelines 201A and 201B of display control unit 200 as illustrated in FIG. 2. In the illustrated embodiment, video/UI pipeline 300 includes fetch unit 305, dither unit 310, line buffer 315, scaler unit(s) 320, color space converter 325, gamut adjust unit 330, and control unit 335. In general, video/UI pipeline 300 may be responsible for fetching pixel data for source frames stored in a memory, and then processing the fetched data before sending the processed data to a blend unit, such as, blend unit 202 of display control unit 200 as illustrated in FIG. 2.

Fetch unit 305 may be configured to generate read requests for source pixel data needed by video/UI pipeline 300. When a read request is generated, the output equivalent pixel of the source pixel data being fetched may be calculated, which is described in more detail below in the discussion of FIG. 4. Also, a QoS priority may be assigned to the read request based on how far ahead in pixels the given requestor is of the next pixel to be popped from the output FIFO (e.g., output FIFO 210 of FIG. 2).

Fetching the source lines from the source buffer is commonly referred to as a "pass" of the source buffer. An initial pass of the source buffer may, in various embodiments, include a fetch of multiple lines from the source buffer. In other embodiments, subsequent passes through of the source buffer may require fewer lines. During each pass of the source buffer, required portions or blocks of data may be fetched from top to bottom, then from left to right, where "top," "bottom," "left," and "right" are in reference to a display. In other embodiments, passes of the source buffer may proceed differently.

Each read request may include one or more addresses indicating where the portion of data is stored in memory. In some embodiments, address information included in the read requests may be directed towards a virtual (also referred to herein as "logical") address space, wherein addresses do not directly point to physical locations within a memory device. In such cases, the virtual addresses may be mapped to physical addresses before the read requests are sent to the source buffer. A memory management unit may, in some embodiments, be used to map the virtual addresses to physical addresses. In some embodiments, the memory management unit may be included within the display control unit, while in other embodiments, the memory management unit may be located elsewhere within a computing system.

Dither unit 310 may, in various embodiments, provide structured noise dithering on the Luma channel of YCbCr formatted data. Other channels, such as the chroma channels of YCbCr, and other formats, such as ARGB may not be dithered. In various embodiments, dither unit 310 may apply a two-dimensional array of Gaussian noise (i.e., statistical noise that is normally distributed) to blocks of the source frame data. A block of source frame data may, in some embodiments, include one or more source pixels. The noise may be applied to raw source data fetched from memory prior to scaling.

Line buffer 315 may be configured to store the incoming frame data corresponding to row lines of a respective display screen. The frame data may be indicative of luminance and chrominance of individual pixels included within the row lines. Line buffer 315 may be designed in accordance with one of various design styles. For example, line buffer 315 may be a SRAM, DRAM, or any other suitable memory type. In some embodiments, line buffer 315 may include a single input/output port, while, in other embodiments, line buffer 315 may have multiple data input/output ports. It is noted that line buffer 315 is representative of any number of line buffers which may be utilized in a given video/UI pipeline.

In one embodiment, control unit 335 may be configured to determine the output coordinate of the youngest consecutively received source pixel which is stored in line buffer 315 for each requestor. In some embodiments, pixel fetch requests may return out of order, and the youngest consecutively received source pixel refers to the youngest source pixel such that all older source pixels are already stored in line buffer 315. The youngest consecutively received source pixel per requestor may be utilized to determine how far ahead each requestor is of the next pixel to be popped out of the output FIFO. A QoS priority level may be assigned to the requestor based on how far ahead the requestor is of the next pixel to be popped out of the output FIFO, such that the further ahead a given requestor is of the next pixel to be popped, the lower the priority assigned to the given requestor.

In some embodiments, scaling of source pixels may be performed in two steps. The first step may perform a vertical scaling, and the second step may perform a horizontal scaling. In the illustrated embodiment, scaler unit(s) 320 may perform the vertical and horizontal scaling. Scaler unit(s) 320 may be designed according to one of varying design styles. In some embodiments, the vertical scaler and horizontal scaler of scaler unit(s) 320 may be implemented as 9-tap 32-phase filters. These multi-phase filters may, in various embodiments, multiply each pixel retrieved by fetch unit 305 by a weighting factor. The resultant pixel values may then be added, and then rounded to form a scaled pixel. The selection of pixels to be used in the scaling process may be a function of a portion of a scale position value. In some embodiments, the weighting factors may be stored in a programmable table, and the selection of the weighting factors to use in the scaling may be a function of a different portion of the scale position value.

In some embodiments, the scale position value (also referred to herein as the "display position value"), may included multiple portions. For example, the scale position value may include an integer portion and a fractional portion. In some embodiments, the determination of which pixels to scale may depend on the integer portion of the scale position value, and the selecting of weighting factors may depend on the fractional portion of the scale position value. In some embodiments, a Digital Differential Analyzer (DDA) may be used to determine the scale position value.

Color management within video/UI pipeline 300 may be performed by color space converter 325 and gamut adjust unit 330. In some embodiments, color space converter 325 may be configured to convert YCbCr source data to the RGB format. Alternatively, color space converter may be configured to remove offsets from source data in the RGB format. Color space converter 325 may, in various embodiments, include a variety of functional blocks, such as an input offset unit, a matrix multiplier, and an output offset unit (all not shown). The use of such blocks may allow the conversion from YCbCr format to RGB format and vice-versa.

In various embodiments, gamut adjust unit 330 may be configured to convert pixels from a non-linear color space to a linear color space, and vice-versa. In some embodiments, gamut adjust unit 330 may include a Look Up Table (LUT) and an interpolation unit. The LUT may, in some embodiments, be programmable and be designed according to one of various design styles. For example, the LUT may include a SRAM or DRAM, or any other suitable memory circuit. In some embodiments, multiple LUTs may be employed. For example, separate LUTs may be used for Gamma and De-Gamma calculations.

It is note that the embodiment illustrated in FIG. 3 is merely an example. In other embodiments, different functional blocks and different configurations of functional blocks are possible and contemplated.

Figure 4:
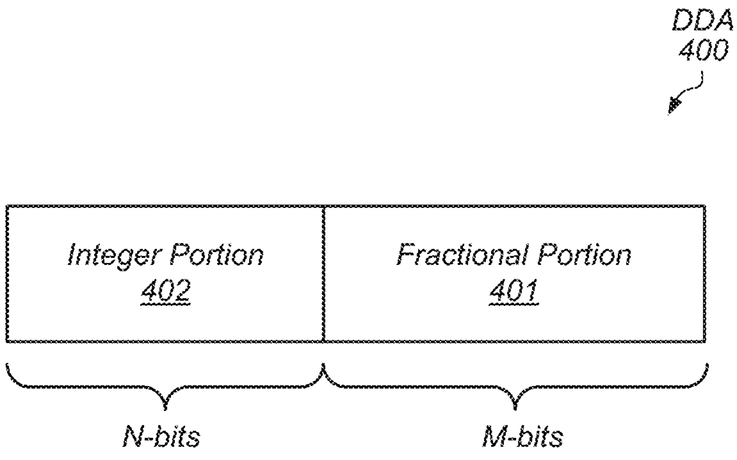
FIG. 4 illustrates one embodiment of a Digital Differential Analyzer (DDA).

Turning now to FIG. 4, one embodiment of a Digital Differential Analyzer (DDA) 400 is shown. In the illustrated embodiment, DDA 400 includes a (N+M)-bit register which may be configured to store a (N+M)-bit fixed point number in two's complement format, wherein 'N' and 'M' are positive integers. In some embodiments, the (N+M)-bit fixed point number may include an N-bit integer portion and an M-bit fraction portion. In one embodiment, 'N' may be 16 and 'M' may be 20. In other embodiments, other values of 'N' and 'M' may be utilized. DDA 400 may, in some embodiments, be divided into two portions such as fractional portion 401 and integer portion 402, each of which may be configured to store respective portions of the fixed point number. In some embodiments, the number stored in DDA 400 may be rounded. When rounding is performed, the fractional portion of the number may be rounded first, and the result of rounding the fractional portion may be used when rounding the integer portion of the fixed point number.

During operation, DDA 400 may be initialized with a starting value. A step value may then be added to the value stored in DDA 400. In some embodiments, a step value of less than one may indicate that a given portion of source pixel data is being upscaled. A step value of greater than one may indicate that a given portion of source pixel data is being downscaled. In some embodiments, luminance and chrominance values of YCbCr format pixel data may be scaled individually.

DDA 400 may be designed according to one of various design styles. In some embodiments, DDA 400 may include multiple latches, flip-flops, or any other suitable storage circuitry coupled together in parallel to form the bit width necessary to store the fixed point number. Such latches and flip-flops may be particular embodiments of storage circuits configured to store a single data bit, and may in various embodiments, be configured to operate synchronously or asynchronously. In some embodiments, the latches or flip-flops may be configured to reset to a predetermined value, such as a logical 0. It is noted that a "logical 0" (also referred to as a "low" or "low logic level") refers to a voltage at or near ground potential and that a "logical 1" (also referred to as a "high" or "high logic level") refers to a voltage level sufficiently large to activate an re-channel Metal-Oxide Semiconductor Field-Effect Transistor (MOSFET). In other embodiments, different technology may result in different voltage levels for "low" and "high."

Video pipelines 201A and 201B (of FIG. 2) may each calculate output coordinates for the portion of the image data each pipeline is fetching and processing. The calculation of the output coordinates may depend on a scale factor and a step applied within each DDA of video/UI pipelines 201A and 201B. In some embodiments, when the scale factor is one such that the source pixel data does not need to be scaled, the display region may equal the source region and a separate calculation of display coordinates may not be necessary.

Each of video/UI pipelines 201A and 201B may utilize their own DDA unit to perform separate calculations for the x-component and y-component of the output coordinate. In some embodiments, the inverse of the horizontal step within the DDA units may be used to determine the x-component. The size of a pixel, an offset in the destination, and scaling factors (both horizontal and vertical) may also be used in the course of calculating the x-component and y-component of the output coordinate.

For a first pass of each plane in a given video/UI pipeline, the output Y coordinate may be initialized to the appropriate starting value. The output Y coordinate may then be incremented for each subsequent pass of the plane. The output X coordinate may be initialized to the appropriate starting value and then incremented with the inverse of the DDA step size for each new input pixel. In one embodiment, the DDA unit used to calculate the X coordinate may also be a signed 36-bit value similar to DDA 400. The X coordinate may be incremented by the inverse of the DDA step size for each new column of input pixels being fetched.

It is noted that the embodiment of a DDA depicted in FIG. 4 is one of many possible embodiments. In other embodiments, different bit widths and different configurations of bits within the register may be employed.

Referring now to FIG. 5, one embodiment of a table of per-requestor pixel distances is shown. Table 500 includes information for a plurality of requestors, and this information includes a calculated per-requestor pixel distance. A control unit (e.g., control unit 205 of FIG. 2) may be configured to maintain table 500. As shown, table 500 includes information for four separate requestors. It is noted that in other embodiments, a display control unit (e.g., display control unit 200 of FIG. 2) may have other numbers of requestors either less than or greater than four. Additionally, the information stored in table 500 may be stored in the display control unit in any suitable structure, depending on the embodiment, and not necessarily in a table.

The requestor IDs 505A-D may be assigned to the different planes of video and/or user interface source frames being used to produce a destination frame. For example, in one embodiment, requestor ID 505A may be a first plane of a first source frame, requestor ID 505B may be a second plane of the first source frame, requestor ID 505C may be a first plane of a second source frame, and requestor ID 505D may be a second plane of the second source frame. In other embodiments, the requestor 505A-D may be assigned differently to the planes of the one or more source frames and/or there may be other numbers of requestors besides four.

For each requestor 505A-D, the output coordinate calculated for the oldest outstanding read request may be determined and stored in table 500. Also, the output coordinate of the oldest pixel in the pipeline for each requestor 505A-D may also be determined and stored in table 500. In some cases, the oldest pixel may correspond to the next pixel to be popped from the output FIFO (e.g., output FIFO 210 of FIG. 2).

The total per-requestor pixel distance ahead may be calculated using the output coordinates of the oldest outstanding read request and oldest pixel in table 500. The total per-requestor pixel distance ahead corresponds to the number of consecutive source pixels already retrieved from memory and available for all processing stages, with the pixel distance computed in terms of output pixels. It is noted that the total per-requestor consecutive pixel count is not necessarily the same as the total pixel count. For example, a requestor may have received several younger source pixels but may still be waiting to receive an older source pixel. Therefore, these younger source pixels will not count toward the total per-requestor consecutive pixel count shown in table 500. The distance ahead for each requestor is measured in output pixels. Some of these output pixels may correspond to source pixels stored in the corresponding line buffer, other processing stages (e.g., scaler unit(s)), or output pixels stored in the output FIFO. The distance indicates how many additional consecutive output pixels are either already ready to be output to the display or can be created from the already received source pixels.

As shown in table 500, requestor ID 505A is 4126 output pixels ahead of the next pixel to be popped (or oldest equivalent coordinate (N,M)) and requestor ID 505B is 2077 output pixels ahead. For the purposes of this discussion, it may be assumed that a row of the output frame is 2048 pixels wide, although other row sizes may be utilized in other embodiments. Additionally, it may also be assumed these pixel distances are sufficient to maintain enough margin of error for processing purposes and therefore these requestors may be assigned the lowest QoS level of green. For example, in one embodiment, an output pixel distance of greater than 2000 pixels may correspond to a QoS level of green, an output pixel distance of greater than 1000 pixels and less than 2000 pixels may correspond to a QoS level of yellow, and an output pixel distance of less than 1000 pixels may correspond to a QoS level of red. It is noted that on and off thresholds may be utilized to permit hysteresis in the changing between QoS levels.

Requestor ID 505C is 1208 pixels ahead as shown in table 500, and this distance may correspond to a QoS level of yellow in this example. Requestor ID 505D is lagging behind the other requestors and is only 8 pixels ahead of the next pixel to be popped, and this distance may correspond to the highest QoS level of red. These example output pixel distances and corresponding QoS level priorities are used merely for illustrative purposes. For example, the threshold levels used for assigning QoS levels or red, green, and yellow may vary according to the embodiment and may differ from the examples shown in table 500.

Figure 6:
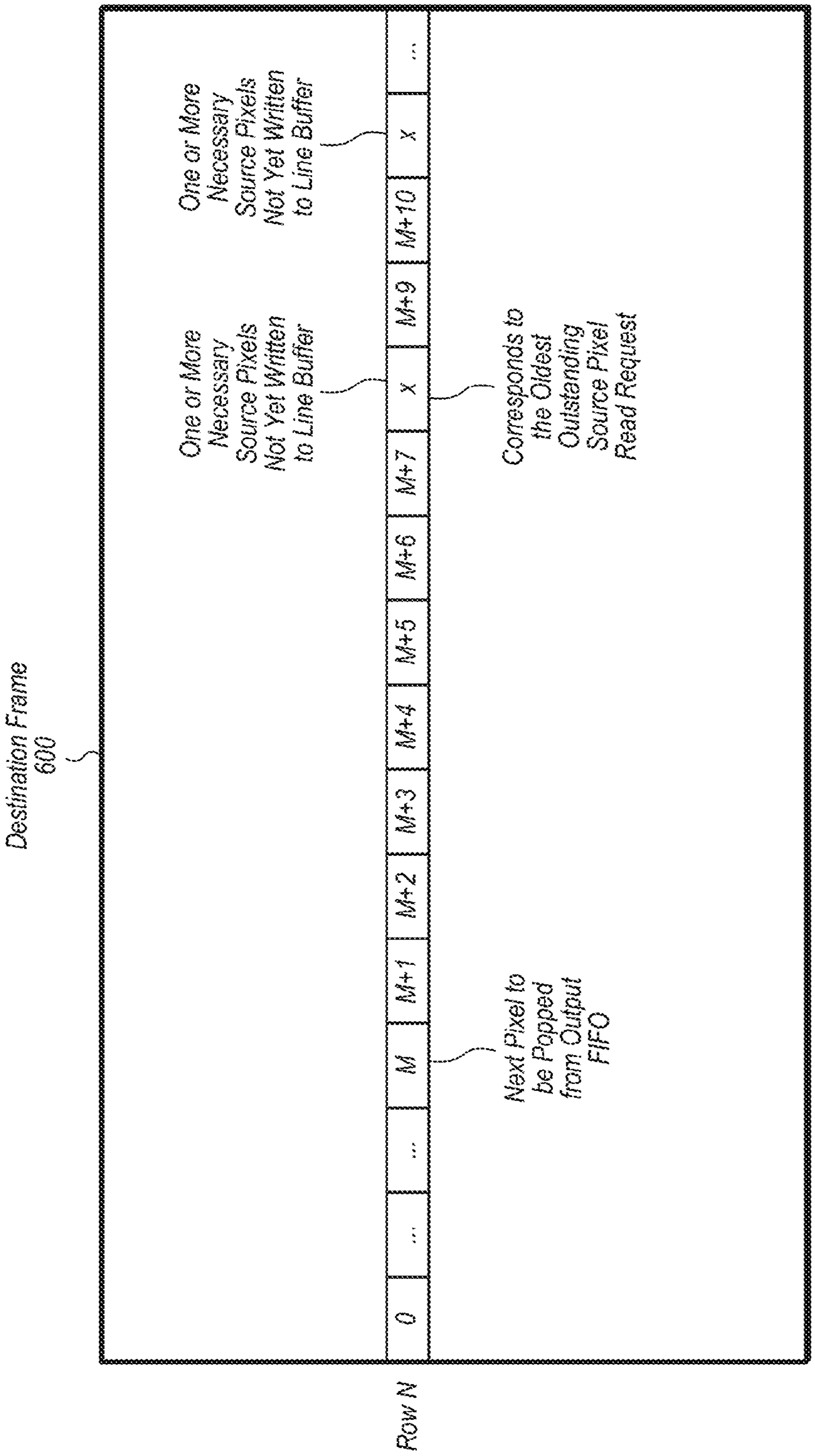
FIG. 6 illustrates one embodiment of a destination frame showing the output coordinates of pixels retrieved for a given requestor.

Turning now to FIG. 6, a block diagram of a destination frame 600 showing the output coordinates of pixels retrieved for requestor 505D is shown. The pixels which have been retrieved and stored in the display pipeline for requestor 505D and have not yet been popped from the output FIFO are shown in their output equivalent coordinate locations within destination frame 600. As shown in table 500 (of FIG. 5), the output pixel corresponding to the oldest outstanding source pixel read request for requestor 505D is 8 pixels ahead of the output coordinate of the oldest pixel (i.e., the next pixel to be popped from the output FIFO).

The pixels shown in destination frame 600 are located on row N. It may be assumed for the purposes of this discussion that the next pixel to be popped from the output FIFO is the pixel with an output coordinate of (N,M). The other pixels from output coordinates of (N,M+1) through (N,M+7) are also present within the corresponding video/UI pipeline. The pixel with an output coordinate of (N,M+8) is the output pixel corresponding to the oldest outstanding read request in this example since all older pixels have already been retrieved and stored within the video/UI pipeline.

It may be assumed for the purposes of this discussion that one or more necessary source pixels corresponding to the output pixel with output coordinate of (N,M+8) have not yet been stored in the line buffer of the corresponding video/UI pipeline. This is indicated with an ‘x’ in the location of output coordinate (N,M+8) in destination frame 600. It may also be assumed that the source pixels corresponding to output pixels with output coordinates of (N,M+9) and (N,M+10) have been retrieved and stored in the line buffer of the video/UI pipeline. In some cases, younger source pixels may be received by the line buffer ahead of older source pixels in systems that support out-of-order processing of pixel fetch requests. In the example shown in FIG. 6, the youngest output pixel for which the corresponding one or more necessary source pixels have been received for requestor 505D has an output coordinate of (N,M+10). However, this output coordinate may not be the one that is used in the calculation of the pixel distance ahead for requestor 505D since there are one or more missing source pixels corresponding to the older output pixel at (N,M+8). Therefore, to calculate the pixel distance ahead, the output equivalent coordinate corresponding to the oldest outstanding read request may be used rather than the output equivalent coordinate of the youngest received source pixel.

It is to be understood that the example shown in FIG. 6 is merely intended to illustrate how pixel distances are calculated for output coordinates of a destination frame for a single requestor in accordance with one embodiment. Other embodiments may calculate pixel distance using other suitable techniques. It is also noted that in a typical embodiment, a given requestor may be many rows ahead of the next pixel to be popped rather than on the same row.

Figure 7:
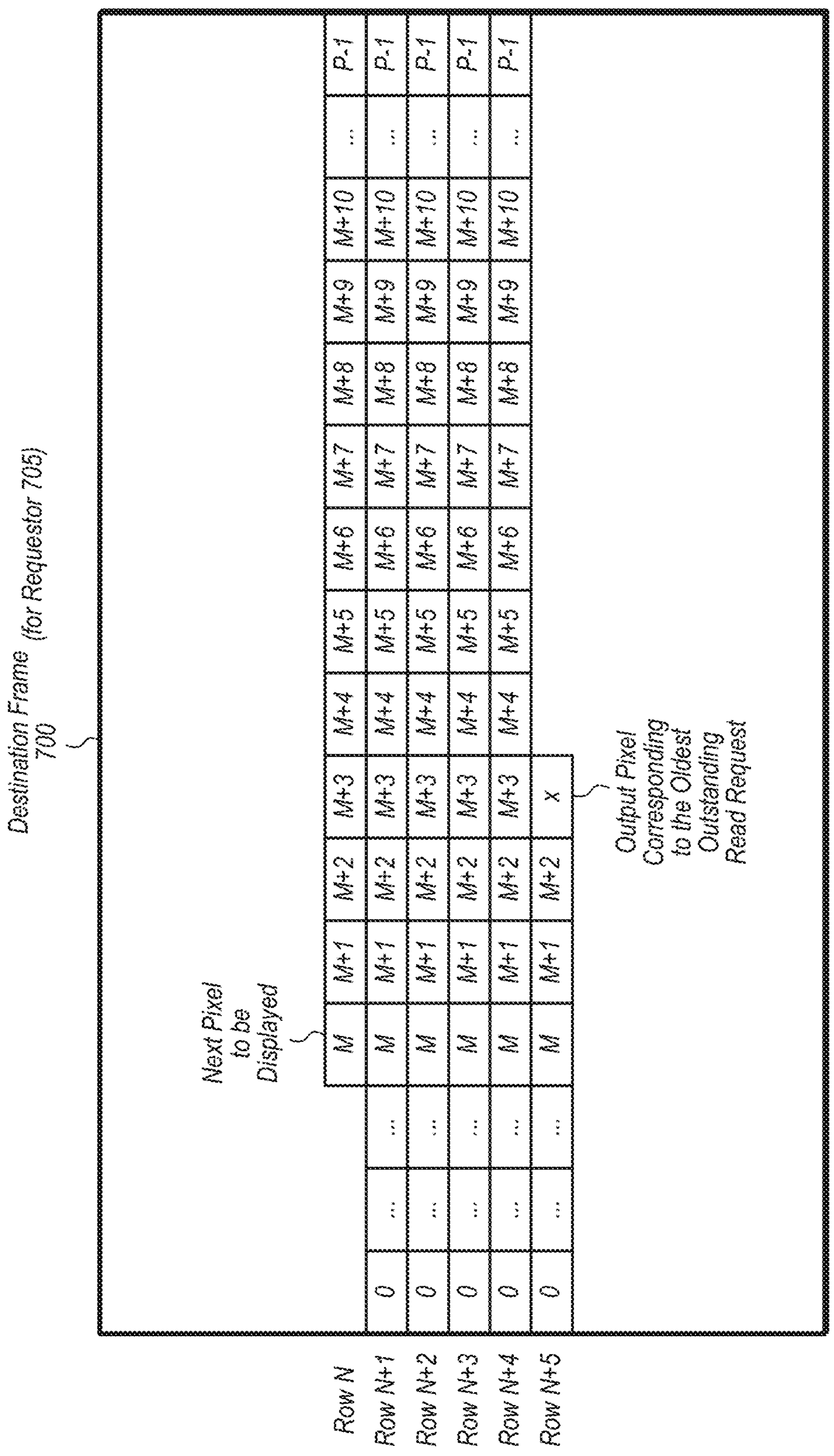
FIG. 7 illustrates one embodiment of a destination frame showing the output coordinates of pixels retrieved for an individual requestor.

Turning now to FIG. 7, a block diagram of a destination frame 700 showing the output coordinates of pixels retrieved for an individual requestor 705 is shown. The pixels which have been retrieved and stored in the display control unit (e.g., display control unit 200 of FIG. 2) for the given requestor 705 and which have not yet been conveyed from the display control unit to the display are shown in their output equivalent coordinate locations within destination frame 700.

The pixels shown in destination frame 700 are located on row N through row N+5. It may be assumed for the purposes of this discussion that the next pixel to be displayed is the pixel with an output coordinate of (N,M). It may also be assumed that all necessary source pixels needed to produce the consecutive output pixels from column 'M' of row N to column 'M+2' of row N+5 for the given requestor have been received by the corresponding video/UI pipeline of the display control unit and have not yet been conveyed to the display. These consecutive pixels may be stored in the corresponding line buffer, output FIFO, or another location (e.g., scaler unit) within the display control unit. The pixel with an output coordinate of (N+5,M+3) is shown as the output pixel corresponding to the oldest outstanding read request in this example since all of the necessary source pixels to produce older output pixels have been retrieved and stored within the video/UI pipeline.

In one embodiment, the control logic (e.g., control unit 205 of FIG. 2) of the display control unit may calculate the pixel distance from the next pixel to be displayed (coordinate (N, M)) to the youngest output equivalent coordinate for which all necessary source pixels have been received without any intervening gaps (coordinate (N+5, M+2)). This pixel distance may be based on a scan pattern used to determine an order in which pixels are conveyed for display on a display device. It may be assumed for the purposes of this discussion that the scan pattern goes from left to right and from top to bottom. It may also be assumed that a row contains 'P' pixels. Therefore, using this scan pattern and row length, the pixel distance between the next pixel to be displayed and the output equivalent coordinate of the youngest consecutively received source pixel data is 5*P+2 pixels. Alternatively, in another embodiment, the control logic may calculate the pixel distance between the next pixel to be displayed (coordinate (N, M)) and the pixel corresponding to the oldest outstanding pixel fetch request for the given requestor (coordinate (N+5, M+3). This pixel distance would be 5*P+3 pixels for this example.

Figure 8:
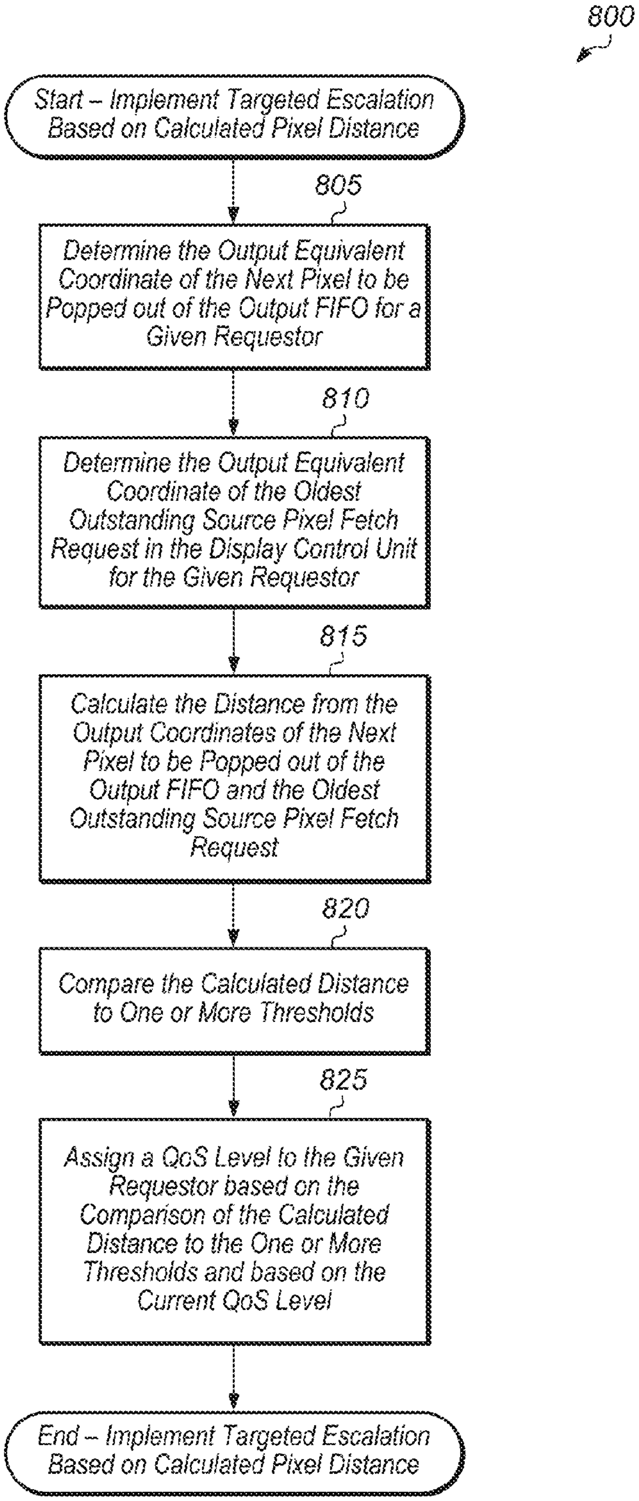
FIG. 8 is a generalized flow diagram illustrating one embodiment of a method for implementing targeted escalation of pixel requests based on a calculated pixel distance.

Referring now to FIG. 8, one embodiment of a method 800 for implementing targeted escalation of pixel requests based on a calculated pixel distance is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. It is noted that a separate instance of method 800 may be performed for each requestor in the display control unit (e.g., display control unit 200 of FIG. 2).

Control logic (e.g., control unit 205 of FIG. 2) may determine the output equivalent coordinate of the next pixel to be popped out of the output FIFO (e.g., output FIFO 210 of FIG. 2) for the given requestor (block 805). Alternatively, the control logic may determine the output equivalent coordinate of the last popped pixel out of the output FIFO for the given requestor. In some cases, the output equivalent coordinate of the next pixel to be popped out of the output FIFO may be the same for each requestor of the plurality of requestors.

The control logic may also determine the output equivalent coordinate of the oldest outstanding source pixel fetch request for the given requestor (block 810). In one embodiment, received source pixels may be stored in one or more line buffers (e.g., line buffer 315 of FIG. 3) of the video/UI pipe (e.g., video/UI pipe 201A-B of FIG. 2) within the display control unit.

Next, the control logic may calculate the distance between the output coordinate of the next pixel to be popped and the output coordinate of the oldest outstanding source pixel fetch request (block 815). This distance may be calculated in terms of the pixel scan pattern being used to fetch source pixels from the source frame(s). Then, the control logic may compare the calculated distance to one or more thresholds (block 820). Next, the control logic may assign a QoS level to the given requestor based on the comparison of the calculated distance to the one or more thresholds and based on the current QoS level (block 825). The QoS level may be assigned to new source pixel fetch requests generated by the given requestor and may also be used to update the QoS level of the given requestor's outstanding source pixel fetch requests in the memory subsystem via a sideband signal. In one embodiment, the control logic may implement on and off thresholds to permit hysteresis in the changing between QoS levels. That is, for each QoS level there may be an on threshold above which the calculated distance is to rise to increase the QoS level, and an off threshold below which the calculated distance is to drop to decrease the QoS level. In such embodiments, the current QoS level may be included in determining the QoS level for a request, in addition to the thresholds. Other embodiments may not implement hysteresis and may have one threshold level per QoS level. It is noted that embodiments which support hysteresis may be programmed to operate without hysteresis by setting the on and off thresholds to the same value. In other embodiments, other techniques for setting the QoS level of the given requestor based on the calculated distance may be utilized. After block 825, method 800 may end. It is noted that method 800 may be performed on a periodic basis, for example, every 'N' clock cycles. Alternatively, method 800 may be performed for a given requestor in response to detecting a triggering event (e.g., line buffer occupancy falls below a programmable threshold).

Figure 9:
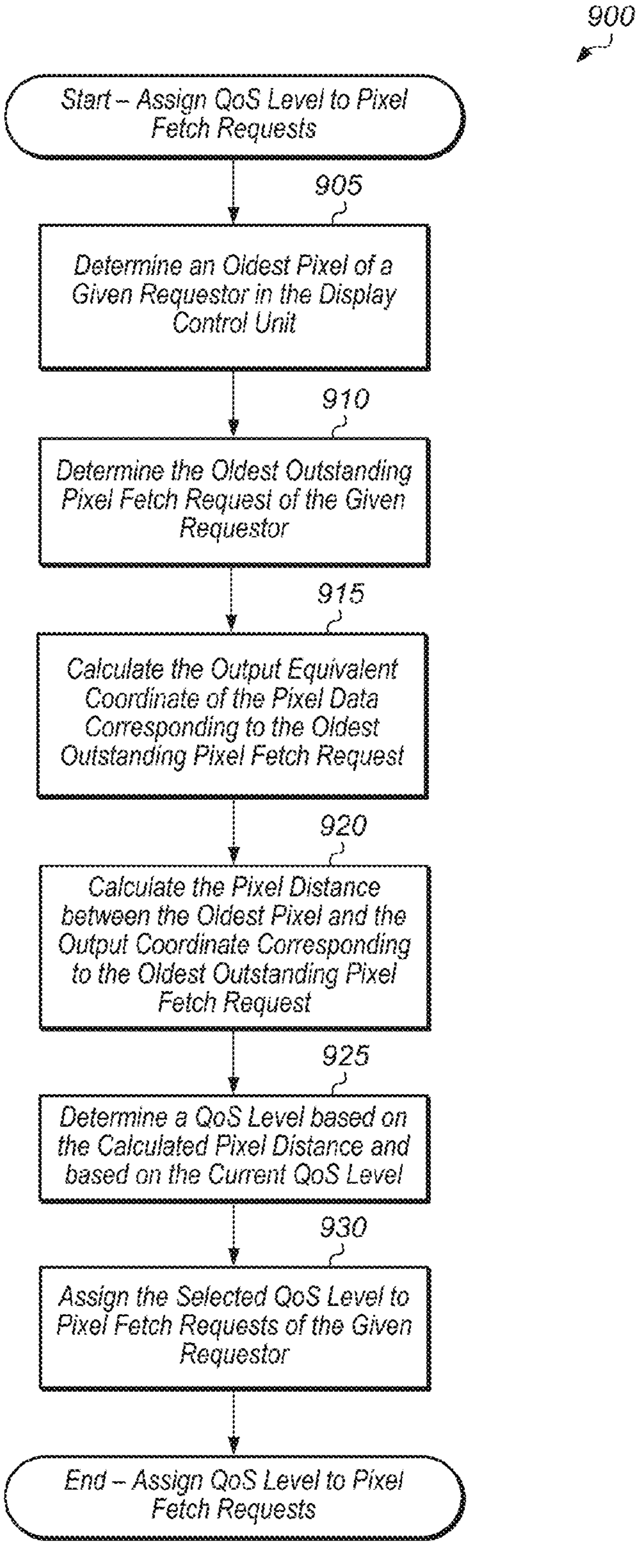
FIG. 9 is a generalized flow diagram illustrating one embodiment of a method for assigning QoS levels to pixel fetch requests.

Turning now to FIG. 9, one embodiment of a method 900 for assigning QoS levels to source pixel fetch requests is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. It is noted that a separate instance of method 900 may be performed for each requestor in a display control unit (e.g., display control unit 200 of FIG. 2).

Control logic (e.g., control unit 205 of FIG. 2) may determine an oldest pixel of a given requestor in the display control unit (block 905). In one embodiment, the oldest pixel may refer to the next pixel to be conveyed from the display control unit to a display. Also, the control logic may determine the oldest outstanding pixel fetch request of the given requestor which has not yet been received by the display control unit (block 910). In one embodiment, when a pixel fetch request is sent from the display control unit to the memory subsystem, one or more entries may be allocated for the pixel fetch request in the corresponding line buffer of the video/UI pipe. When the source pixel data corresponding to the pixel fetch request is retrieved and sent to the display control unit, the source pixel data may be stored in the one or more allocated entries of the corresponding line buffer. In this embodiment, the control logic may determine the oldest empty allocated entry of the line buffer corresponding to the given requestor. Additionally, the output equivalent coordinate of the pixel data corresponding to the oldest outstanding pixel fetch request of the given requestor may be calculated (block 915).

Next, the control logic may calculate a pixel distance between the oldest pixel and the output coordinate corresponding to the oldest outstanding pixel fetch request (block 920). The control logic may utilize the output equivalent coordinate calculated in block 915 to calculate the pixel distance. The pixel distance refers to the pixel scan pattern distance between the oldest pixel and the output equivalent coordinate of the pixel corresponding to the oldest outstanding pixel fetch request. It is noted that any of various scan patterns may be used when conveying pixels from the display control unit to the display, depending on the embodiment.

Next, the control logic may determine a QoS level based on the calculated pixel distance and on the current QoS level (block 925). The QoS level may be inversely proportional to the calculated pixel distance such that a relatively large calculated pixel distance will result in a relatively low QoS level and a relatively small calculated pixel distance will result in a relatively high QoS level. Then, the selected QoS level may be assigned to pixel fetch requests of the given requestor (block 930). The selected QoS level may be assigned to outstanding pixel fetch requests and/or new fetch requests of the given requestor. After block 930, method 900 may end.

It is noted that when a relatively high QoS level is assigned to the given requestor, the pixel fetch requests will be serviced with a higher priority by the memory subsystem than other memory requests of other requestors with a relatively low QoS level. It is noted that method 900 may be performed on a periodic basis, for example, every 'N' clock cycles, wherein N is a programmable integer. Alternatively, method 900 may be performed for a given requestor in response to detecting a triggering event.

Figure 10:
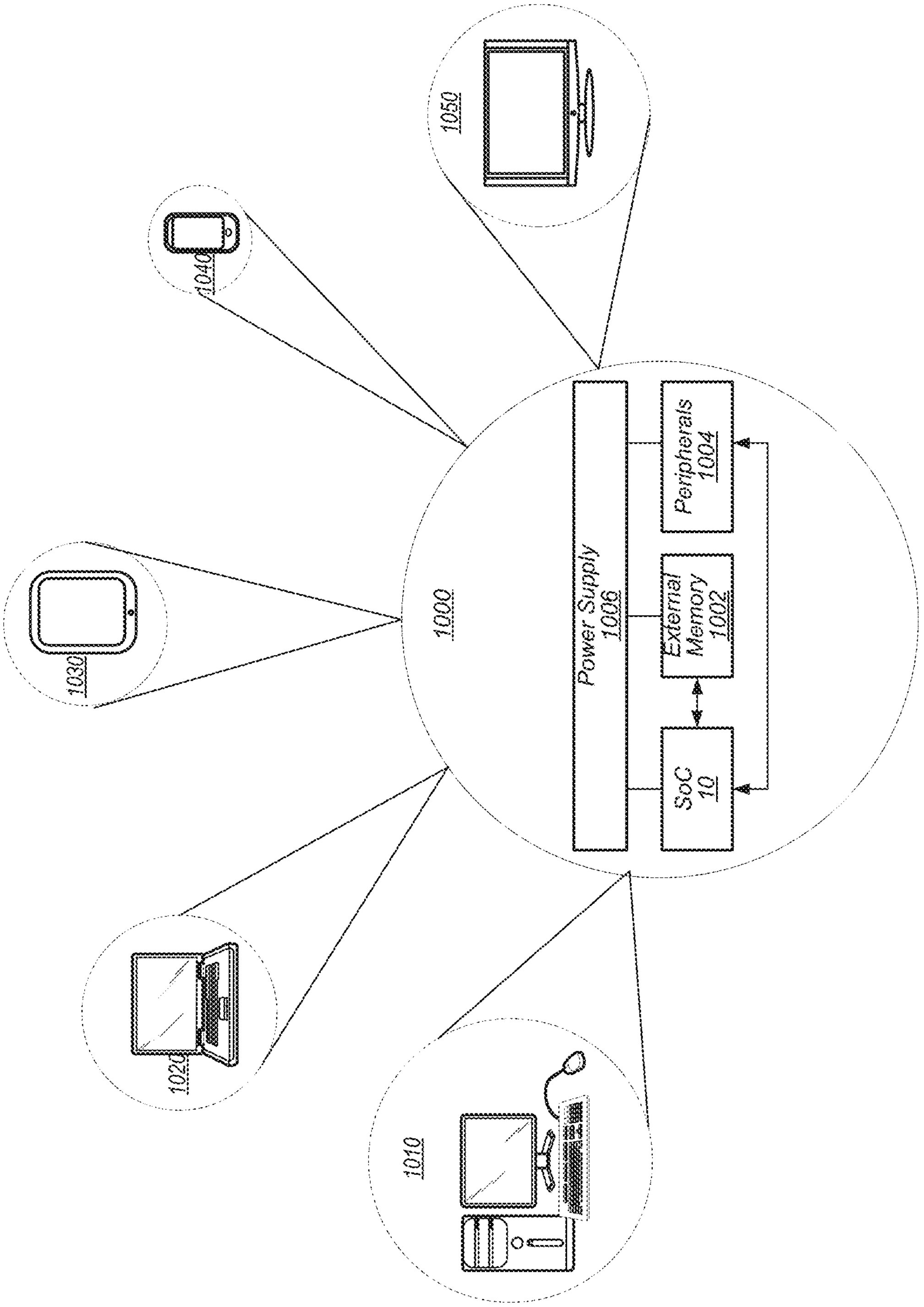
FIG. 10 is a block diagram of one embodiment of a system.

Referring next to FIG. 10, a block diagram of one embodiment of a system 1000 is shown. As shown, system 1000 may represent chip, circuitry, components, etc., of a desktop computer 1010, laptop computer 1020, tablet computer 1030, cell phone 1040, television 1050 (or set top box configured to be coupled to a television), or otherwise. Other devices are possible and are contemplated. In the illustrated embodiment, the system 1000 includes at least one instance of SoC 10 (of FIG. 1) coupled to an external memory 1002.

SoC 10 is coupled to one or more peripherals 1004 and the external memory 1002. A power supply 1006 is also provided which supplies the supply voltages to SoC 10 as well as one or more supply voltages to the memory 1002 and/or the peripherals 1004. In various embodiments, power supply 1006 may represent a battery (e.g., a rechargeable battery in a smart phone, laptop or tablet computer). In some embodiments, more than one instance of SoC 10 may be included (and more than one external memory 1002 may be included as well).

The memory 1002 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with SoC 10 in a chip-on-chip configuration, a package-on-package configuration, or a multi-chip module configuration.

The peripherals 1004 may include any desired circuitry, depending on the type of system 1000. For example, in one embodiment, peripherals 1004 may include devices for various types of wireless communication, such as wifi, Bluetooth, cellular, global positioning system, etc. The peripherals 1004 may also include additional storage, including RAM storage, solid state storage, or disk storage. The peripherals 1004 may include user interface devices such as a display screen, including touch display screens or multitouch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A method comprising:

identifying an oldest output pixel stored in a display pipeline for a first requestor;

identifying an oldest outstanding pixel fetch request of the first requestor, wherein the oldest outstanding pixel fetch request is for a first source pixel;

calculating an output equivalent coordinate of the first source pixel, wherein the output equivalent coordinate of the first source pixel is a coordinate of an earliest output pixel that cannot be generated without the first source pixel;

calculating a first distance in output pixels between the oldest output pixel and the output equivalent coordinate of the first source pixel within a given output frame;

determining a first quality of service (QoS) level based at least in part on the first distance; and assigning the first QoS level to the oldest outstanding pixel fetch request of the first requestor, wherein requests with the first QoS level are serviced with a higher priority than requests with a second QoS level.

2. The method as recited in claim 1, further comprising:

identifying an oldest output pixel of a second requestor in the display pipeline;

identifying an oldest outstanding pixel fetch request of the second requestor, wherein the oldest outstanding pixel fetch request is for a second source pixel;

calculating an output equivalent coordinate of the second source pixel, wherein the output equivalent coordinate of the second source pixel is a coordinate of an earliest output pixel that cannot be generated without the second source pixel;

calculating a second distance in output pixels between the oldest output pixel of the second requestor and the output equivalent coordinate of the second source pixel of the second requestor within a given output frame;

determining to utilize the second QoS level based at least in part on the second distance and on a current QoS level associated with the second requestor; and assigning the second QoS level to the oldest outstanding pixel fetch request of the second requestor.

3. The method as recited in claim 1, wherein the oldest output pixel of the first requestor is a next pixel to be popped out of an output first-in first-out (FIFO) buffer, and wherein calculating the first distance comprises determining how many output pixels ahead the first requestor is of the next pixel to be popped out of the output FIFO.

4. The method as recited in claim 1, further comprising escalating a QoS level of the oldest outstanding pixel fetch request of the first requestor responsive to determining the first distance is less than a given threshold.

5. The method as recited in claim 4, further comprising compositing the given output frame from a plurality of source frames, wherein there is a separate requestor for each source frame of the plurality of source frames, and wherein only priorities of requests of the first requestor are escalated while priorities of requests of other requestors maintain a current priority level.

6. The method as recited in claim 5, further comprising storing, in a table, a per-requestor count, for each requestor of a plurality of requestors, indicating a number of output pixels that a given requestor is ahead of a next pixel to be popped from an output first-in first-out (FIFO) buffer.

7. The method as recited in claim 1, wherein the first source pixel is part of multiple output pixels in the given output frame based on scaling being performed by the display pipeline.

8. An apparatus comprising:

one or more pixel processing pipelines;

a buffer configured to store received pixel data; and wherein the apparatus is configured to:

identify an oldest output pixel stored in the one or more pixel processing pipelines for a first requestor;

identify an oldest outstanding pixel fetch request of the first requestor, wherein the oldest outstanding pixel fetch request is for a first source pixel;

calculate an output equivalent coordinate of the first source pixel, wherein the output equivalent coordinate of the first source pixel is a coordinate of an earliest output pixel that cannot be generated without the first source pixel;

calculate a first distance in output pixels between the oldest output pixel and the output equivalent coordinate of the first source pixel within a given output frame;

determine a first quality of service (QoS) level based at least in part on the first distance; and assign the first QoS level to the oldest outstanding pixel fetch request of the first requestor, wherein requests with the first QoS level are serviced with a higher priority than requests with a second QoS level.

9. The apparatus as recited in claim 8, wherein the apparatus is further configured to:

identify an oldest output pixel of a second requestor in the one or more pixel processing pipelines;

identify an oldest outstanding pixel fetch request of the second requestor, wherein the oldest outstanding pixel fetch request is for a second source pixel;

calculate an output equivalent coordinate of the second source pixel, wherein the output equivalent coordinate of the second source pixel is a coordinate of an earliest output pixel that cannot be generated without the second source pixel;

calculate a second distance in output pixels between the oldest output pixel of the second requestor and the output equivalent coordinate of the second source pixel of the second requestor within a given output frame;

determine to utilize the second QoS level based at least in part on the second distance and on a current QoS level associated with the second requestor; and assign the second QoS level to the oldest outstanding pixel fetch request of the second requestor.

10. The apparatus as recited in claim 8, wherein the oldest output pixel of the first requestor is a next pixel to be popped out of the buffer, and wherein calculating the first distance comprises determining how many output pixels ahead the first requestor is of the next pixel to be popped out of the buffer.

11. The apparatus as recited in claim 8, wherein the apparatus is further configured to escalate a QoS level of the oldest outstanding pixel fetch request of the first requestor responsive to determining the first distance is less than a given threshold.

12. The apparatus as recited in claim 11, wherein the apparatus is further configured to composite the given output frame from a plurality of source frames, wherein there is a separate requestor for each source frame of the plurality of source frames, and wherein only priorities of requests of the first requestor are escalated while priorities of requests of other requestors maintain a current priority level.

13. The apparatus as recited in claim 12, wherein the apparatus is further configured to store, in a table, a per-requestor count, for each requestor of a plurality of requestors, indicating a number of output pixels that a given requestor is ahead of a next pixel to be popped from the buffer.

14. The apparatus as recited in claim 8, wherein the first source pixel is part of multiple output pixels in the given output frame based on scaling being performed by the one or more pixel processing pipelines.

15. A system comprising:

a display control unit comprising one or more pixel processing pipelines;

an output buffer; and a memory;

wherein the display control unit is configured to:

identify an oldest output pixel stored in the display control unit for a first requestor;

identify an oldest outstanding pixel fetch request of the first requestor, wherein the oldest outstanding pixel fetch request is for a first source pixel;

calculate an output equivalent coordinate of the first source pixel, wherein the output equivalent coordinate of the first source pixel is a coordinate of an earliest output pixel that cannot be generated without the first source pixel;

calculate a first distance in output pixels between the oldest output pixel and the output equivalent coordinate of the first source pixel within a given output frame;

determine a first quality of service (QoS) level based at least in part on the first distance; and assign the first QoS level to the oldest outstanding pixel fetch request of the first requestor, wherein requests with the first QoS level are serviced with a higher priority than requests with a second QoS level.

16. The system as recited in claim 15, wherein the display control unit is further configured to:

identify an oldest output pixel of a second requestor in the display control unit;

identify an oldest outstanding pixel fetch request of the second requestor, wherein the oldest outstanding pixel fetch request is for a second source pixel;

calculate an output equivalent coordinate of the second source pixel, wherein the output equivalent coordinate of the second source pixel is a coordinate of an earliest output pixel that cannot be generated without the second source pixel;

calculate a second distance in output pixels between the oldest output pixel of the second requestor and the output equivalent coordinate of the second source pixel of the second requestor within a given output frame;

determine to utilize the second QoS level based at least in part on the second distance and on a current QoS level associated with the second requestor; and assign the second QoS level to the oldest outstanding pixel fetch request of the second requestor.

17. The system as recited in claim 15, wherein the oldest output pixel of the first requestor is a next pixel to be popped out of the output buffer, and wherein calculating the first distance comprises determining how many output pixels ahead the first requestor is of the next pixel to be popped out of the buffer.

18. The system as recited in claim 15, wherein the display control unit is further configured to escalate a QoS level of the oldest outstanding pixel fetch request of the first requestor responsive to determining the first distance is less than a given threshold.

19. The system as recited in claim 18, wherein the display control unit is further configured to composite the given output frame from a plurality of source frames, wherein there is a separate requestor for each source frame of the plurality of source frames, and wherein only priorities of requests of the first requestor are escalated while priorities of requests of other requestors maintain a current priority level.

20. The system as recited in claim 15, wherein the display control unit is further configured to store, in a table, a per-requestor count, for each requestor of a plurality of requestors, indicating a number of output pixels that a given requestor is ahead of a next pixel to be popped from the output buffer.

* * * * *